United States Patent [19]
Pickering

[11] 4,026,319
[45] May 31, 1977

[54] HYDRAULIC RESERVOIRS FOR VEHICLE BRAKING SYSTEMS

[75] Inventor: John Flory Pickering, Solihull, England

[73] Assignee: Girling Limited, Birmingham, England

[22] Filed: Dec. 11, 1975

[21] Appl. No.: 639,763

[30] Foreign Application Priority Data

Dec. 21, 1974 United Kingdom ............ 55346/74

[52] U.S. Cl. ................................. 137/255; 60/385; 188/345
[51] Int. Cl.[2] ......................................... F15B 7/08
[58] Field of Search .......... 137/255, 262, 265, 558; 188/345, 352; 60/385

[56] References Cited

UNITED STATES PATENTS

| | | | |
|---|---|---|---|
| 3,542,055 | 11/1970 | Belart | 137/255 |
| 3,744,513 | 7/1973 | Leitenberger | 137/255 |

*Primary Examiner*—Alan Cohan
*Attorney, Agent, or Firm*—Scrivener Parker Scrivener & Clarke

[57] ABSTRACT

An hydraulic reservoir for a dual circuit braking system of the kind comprising a container divided into two chambers by a partition provided with a hole at an intermediate height, and a fluid level sensor located in one chamber, in which the chambers are sealed from each other in use apart from the hole in the partition, and one of the chambers is sealed against atmosphere by sealing means which can be released to allow leveling of the fluid during filling.

5 Claims, 4 Drawing Figures

HYDRAULIC RESERVOIRS FOR VEHICLE BRAKING SYSTEMS

SPECIFIC DESCRIPTION

This invention relates to hydraulic reservoirs for vehicle braking systems having at least two braking circuits.

When the braking system is a dual-circuit system it is well known to provide a reservoir which comprises a closed container having a central vertical partition dividing the lower part of the reservoir into two compartments for supplying the two braking circuits. If it is desired to detect a drop in fluid level in either compartment fluid level sensors may be arranged in each of the compartments.

In order to avoid the expense of employing two sensors the partition may be provided at an intermediate height with a hole to provide restricted fluid communication between two compartments, and a single sensor may be used to detect a fall in the fluid level in one of the compartments.

If a leak occurs in the braking system fed from one compartment the fluid level in the other compartment will fall to the level of the bottom edge of the hole in the partition. The fluid level sensor is arranged to detect a fall in the fluid leak to a level which is above the level at the lower edge of the hole so that it is actuated in the event of a fluid leakage from either brake circuit. The hole is positioned at a height such that there is sufficient fluid in either compartment below the level of the bottom edge of the hole for safe braking in the event of loss of fluid from the other compartment.

A disadvantage of this arrangement is that when the vehicle has been inclined for a period of time so that one compartment is lower than the other and the reservoir is then restored to a level attitude the fluid level in the compartment provided with the sensor may then be sufficiently low for the sensor to be actuated. Fluid can also become displaced from one compartment to the other so as to actuate the sensor in the event of a rapid deceleration of the vehicle.

According to the invention an hydraulic reservoir for a vehicle braking system having at least two braking circuits comprises a closed container provided in its upper part with a filler opening and a relief opening and divided internally by a partition into two chambers which are horizontally adjacent to each other when the container is oriented with the openings uppermost, the filler opening commmunicating with one of the chambers, and the relief opening communicating with the other chamber, the partition being provided at an intermediate height thereof with a passage providing fluid communication between the two chambers, and the container being provided with outlets from the chambers adapted to be connected to the respective braking circuits, a detachable filler cap adapted to close the filler opening, and releasable sealing means adapted sealably to close one of the openings so as to seal in use the chamber connected to that opening against atmosphere, the arrangement being such that in use the upper part of the chamber that is not sealed by the sealing means is maintained substantially at atmospheric pressure.

When such a reservoir is provided with a fluid level sensor arranged in one of the chambers to detect a fall of fluid level in that chamber to a level that is above the minimum level at which fluid can flow through the passage to the other chamber when the openings are uppermost and open to atmosphere, then in use trapped air in the sealed chamber resists transfer of fluid between the chambers on tilting of the reservoir or on rapid deceleration of the vehicle.

The relief opening allows venting of air from the chamber connected to it during pouring of fluid into the other chamber through the filler opening. If the relief opening is the opening that is sealed in use by the sealing means then the sealing must, of course, be released before filling.

Preferably, the sealing means is adapted to seal the relief opening rather than the filler opening.

Conveniently the sealing means then comprises a seal carried by the filler cap, and the arrangement is such that when the filler cap is secured in position on the container the relief opening is sealably closed by the seal.

A reservoir for a dual-circuit braking system and in accordance with the invention will now be described, by way of example only, with reference to the accompanying drawings in which.

Figure 1:
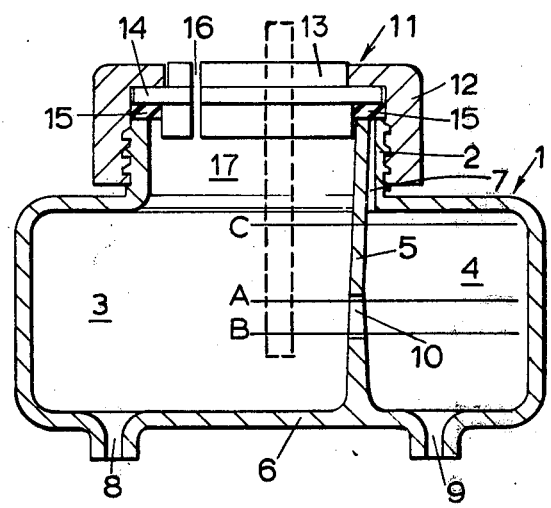
FIG. 1 is a vertical cross section of the reservoir shown in a horizontal attitude with its filler cap secured in position.

A moulded plastics container 1 has a filler neck 2 at its upper end and is divided internally into two chambers 3 and 4 by a vertical substantially plate-like partition 5 which is intergral with the bottom 6 and sides of the container and extends upwardly into and to one side of the filler neck 2 with which it is also integral to define a passage 7 communicating with the chamber 4. The passage 7 in plan has the shape of a minor segment of a circle. Outlets 8 and 9 in the bottom 6 of the container 1 are adapted respectively to connect chambers 3 and 4 to two braking circuits. A hole 10 extends through the partition 5 at an intermediate height thereof and is the only means of communication between the chambers 3 and 4 when the passage 7 is closed off.

A filler cap 11 comprises an internally threaded ring 12 of L-shape in cross-section adapted to be screwed over the filler neck 2 and a cover 13 provided with a radial flange 14 between which and the upper end of the filler neck 2 is trapped on annular seal 15. The radial width of the seal 15 is sufficient to bridge the upper end of the passage 7 and to seal against the upper end of the partition 5 sealably to close the upper end of the passage 7. A vent hole 16 is provided in the cover 13 and communicates with chamber 3. The upper end of passage 7 constitutes a relief opening.

A conventional fluid level sensor, indicated in dotted outline in FIG. 1, is arranged to extend into the chamber 3. Levels A and B in FIG. 1 indicate the limits of the switching tolerance zone of the particular fluid level sensor used. Level C is the maximum level to which the reservoir is intended to be filled with fluid.

To fill the reservoir the filler cap 11 is removed and fluid is poured through filler opening 17 directly into the chamber 3. With the filler cap removed passage 7 is vented to atmosphere to allow air to escape through it as fluid flows into chamber 4 through passage 10. When the fluid level in both chambers 3 and 4 has reached the level C filling is terminated, and the cap is replaced. Replacement of the cap seals off passage 7 to trap a volume of air 18, as shown in FIG. 2.

Figure 2:
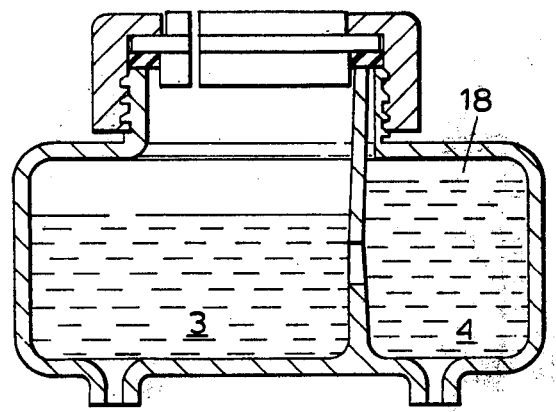
FIGS. 2, 3 and 4 are similar sections on a reduced scale to show the effects on the fluid levels in the two chambers of loss of brake fluid and tilting of the reservoir.

If leakage occurs from either of the braking systems then as shown in FIG. 2, the fluid loss will be supplied initially from chamber 3 and the level of fluid in chamber 3 will fall until it reaches the level of the upper edge of the bore 10. Until it reaches that level the closed volume of air 18 trapped above the fluid in the chamber 4 prevents the fluid level in that chamber from dropping substantially. When the fluid level in chamber 3 reaches the upper edge of the hole 10 transfer of fluid and air between the chambers will for further loss of fluid equalise the fluid levels in the two chambers. As further fluid is lost from either chamber the common fluid level will drop and the sensor will be actuated.

Figure 3:
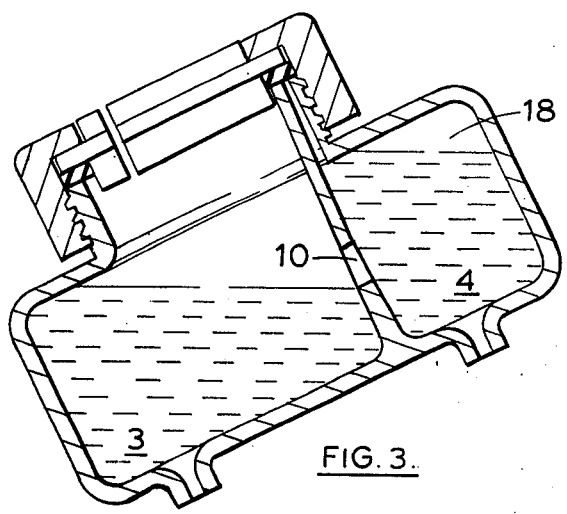
Figure 4:
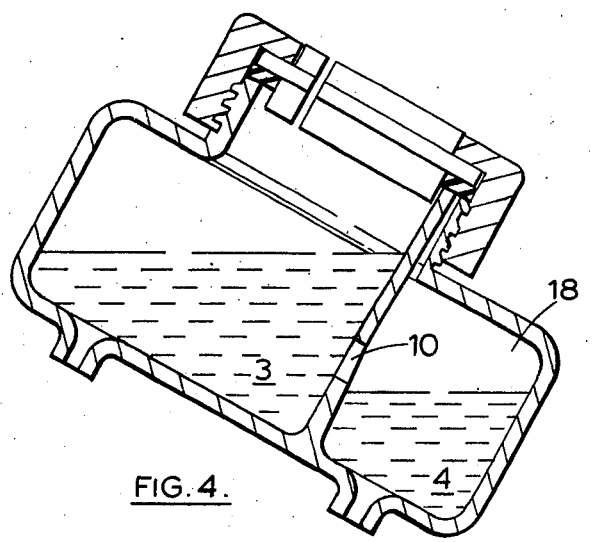

FIGS. 3 and 4 show the effect of tilting the reservoir when it contains the usual quanity of fluid. When it is tilted as in FIG. 3 fluid is restricted from flowing from chamber 4 through the hole 10 to chamber 3 by suction resulting from the sealed volume of air 18. Similarly, when the container is tilted as in FIG. 4 the pressure of the volume of air 18 opposes the flow of fluid from chamber 3 to chamber 4. Thus, when the container is brought back to a level attitude after the vehicle has been tilted for a period of time the fluid transfer from one chamber to the other that has occurred is not sufficient to reduce the level in chamber 3 to actuate the sensor.

It will be appreciated that the invention may be applied to a reservoir divided by partitions into any desired number of chambers for supplying braking systems having more than two braking circuits.

I claim:

1. An hydraulic reservoir for a vehicle braking system having at least two braking circuits comprising a closed container provided in its upper part with a filler opening and a relief opening and divided internally by a partition into two chambers which are horizontally adjacent to each other when the container is oriented with the openings uppermost, the filler opening communicating with one of the chambers, and the relief opening communicating with the other chamber, the partition being provided at an intermediate height thereof with a passage providing fluid communication between the two chambers, and the container being provided with outlets from the chambers adapted to be connected to the respective braking circuits, a fluid level sensor arranged in one of the chambers to detect a fall of the fluid level in that chamber to a level that is above the minimum level at which fluid can flow through the passage to the other chamber when said openings are uppermost and open to atmosphere, a detachable filler cap adapted to close the filler opening, and releasable sealing means adapted sealably to close one of the openings so as to seal in use the chamber connected to that opening against atmosphere when the liquid level is above the top of the passage in at least one of the chambers, the arrangement being such that in use the upper part of the chamber that is not sealed by the sealing means is maintained substantially at atmospheric pressure.

2. An hydraulic reservoir as in claim 1 in which the sealing means is adapted to seal the relief opening.

3. An hydraulic reservoir as in claim 2 in which the filler cap is provided with a vent passage leading to atmosphere.

4. An hydraulic reservoir as in claim 2 in which the sealing means comprises a seal carried by the filler cap.

5. An hydraulic reservoir as in claim 4 in which the partition of the container extends upwardly into a filler neck so that the filler opening is defined in the neck on one side of the partition and the relief opening on the other side, the seal being arranged to seal against the filler neck and against the upper end of the partition when the filler cap is secured in position.

* * * * *